(12) United States Patent
Littlefield

(10) Patent No.: US 9,574,619 B1
(45) Date of Patent: Feb. 21, 2017

(54) PAWL GROUNDING CLUTCH WITH SYNCHRONIZER

(71) Applicant: GM Global Technology Operations LLC, Detroit, MI (US)

(72) Inventor: Joseph Ralph Littlefield, Sterling Heights, MI (US)

(73) Assignee: GM Global Technology Operations, LLC, Detroit, MI (US)

( * ) Notice: Subject to any disclaimer, the term of this patent is extended or adjusted under 35 U.S.C. 154(b) by 0 days.

(21) Appl. No.: 14/939,636

(22) Filed: Nov. 12, 2015

(51) Int. Cl.
*F16H 3/44* (2006.01)
*F16D 11/16* (2006.01)
*F16D 23/02* (2006.01)
*F16D 23/12* (2006.01)

(52) U.S. Cl.
CPC ............... *F16D 11/16* (2013.01); *F16D 23/02* (2013.01); *F16D 23/12* (2013.01)

(58) Field of Classification Search
None
See application file for complete search history.

(56) References Cited

U.S. PATENT DOCUMENTS

| | | | |
|---|---|---|---|
| 7,698,795 B2 | 4/2010 | Brock |
| 7,743,678 B2 | 6/2010 | Wittkopp |
| 8,091,696 B2 | 1/2012 | Wittkopp |
| 8,297,421 B2 | 10/2012 | Mankame |
| 9,181,993 B1 | 11/2015 | Swales |

*Primary Examiner* — Dirk Wright

(57) ABSTRACT

A pawl grounding clutch with synchronizer assembly attached to a planetary gear set of a drive unit. A cylindrical hub is engaged to the ring gear and the hub co-rotates with the ring gear. A gear is fixed to the hub. A pawl having a pawl tooth rotates between a first position with the pawl tooth spaced away from the gear and a second position having the pawl tooth engaged between successive gear teeth. A synchronizer rotates during pawl rotation and includes a friction surface directly contacting the hub before the pawl tooth engages the gear. A shift member displaces the pawl between the first and second positions. The pawl in the second position engages the ring gear with a case defining a clutch closed position. The pawl in the first position disengages ring gear from the case, defining a clutch open position.

20 Claims, 9 Drawing Sheets

PAWL GROUNDING CLUTCH WITH SYNCHRONIZER

FIELD

The present disclosure relates to a clutch assembly used for a transmission shift operation, the clutch assembly operating a pawl connected to a synchronizer.

BACKGROUND

The statements in this section merely provide background information related to the present disclosure and may or may not constitute prior art.

Traditional automatic transmissions use friction clutches in the form of either band clutches or multi-plate friction clutches. Friction clutches work by pressing two plates together. Friction between clutch elements allows the transfer of energy by allowing one plate to spin faster than the other or to slip. Automatic transmissions use friction clutches so that changing gear doesn't require engine power to drop. While changing gears, an automatic transmission can disconnect one clutch as it engages another. When ambient temperature drops below zero, however, and particularly at temperatures approaching −40° F. the hydraulic fluid pressure required to actuate friction clutches requires increased pump capacity, which may not be available in smaller engine and vehicle designs.

Dog clutches can be used in place of friction clutches and are commonly used in manual transmissions. Dog clutches are interference in lieu of slip clutches. Power is transmitted by a tooth of one side pressing on a tooth of the other side. Dog clutches cannot slip therefore they are either engaged or disengaged. Dog clutches suffer little parasitic loss and are simple and compact. Synchronizer dog clutches commonly employed in manual transmissions synchronize the speed of two components prior to engagement of those two components. Known synchronizers include a conical sleeve integrally connected to a blocker or dog ring. The sleeve has a set of teeth and is rotationally fixed to a first component and is longitudinally translatable along an axis of rotation to engage a set of teeth located on a second component. Longitudinal movement of the sleeve toward the direction of the second component initially causes a frusto-conical surface of the blocker ring to engage a matching frusto-conical surface on the second component prior to engagement of the teeth. Engagement of these two surfaces is a clutching action which causes the second component to be speed synchronized with the blocker ring and sleeve and thus the first component.

Known dog clutch synchronizers and their conical sleeves and one-way ball bearing clutches are limited in that they only provide actuator force in one direction. In an application such as engagement of a final drive planetary gear set with a differential, known dog clutches do not allow actuation under load.

SUMMARY

According to several aspects, a pawl grounding clutch with synchronizer assembly for a motor vehicle includes a gear fixed to a hub. A pawl having a pawl tooth is rotated between a first position with the pawl tooth spaced away from gear teeth of the gear and a second position having the pawl tooth engaged between two successive teeth of the gear. A synchronizer is rotated during rotation of the pawl, the synchronizer directly contacting the hub before the pawl tooth engages the gear. A shift member when contacting the pawl displaces the pawl between the first position and the second position.

According to further aspects, the pawl grounding clutch with synchronizer assembly further includes a planetary gear set of a drive unit containing multiple members, the cylindrical hub engaged to one of the members of the planetary gear set such that the hub is co-rotated with the engaged planetary gear set member.

According to further aspects, the pawl in the second position with the pawl tooth engaged with the gear teeth engages the planetary gear set member with a case defining a clutch closed position, and wherein the pawl in the first position with the pawl tooth disengaged from the gear teeth disengages the planetary gear set member from the case, thereby defining a clutch open position.

According to further aspects, in the clutch open position, a distance between the friction surface of the synchronizer and the hub is less than a distance between the pawl tooth and a free end of a closest gear tooth of the gear.

According to further aspects, the hub and the planetary gear set member are coaxially aligned on a common longitudinal axis.

According to further aspects, the planetary gear set includes a ring gear having multiple crenellated members.

According to further aspects, the hub defines a cylindrical body including multiple fingers extending from a first end of the body individually received between successive ones of the crenellated members of the ring gear to engage the hub to the ring gear.

According to further aspects, the gear is fixed to a second end of the hub opposite to the fingers, the second end of the hub and the gear being rotatably supported to a case of a transmission using a bearing assembly.

According to further aspects, a guide is fixed to a case, wherein a portion of the shift member is positioned within and is slidingly received by the guide.

According to further aspects, the shift member is moved between each of a first shift position, defining a transmission neutral position, and a second shift position, defining a transmission engaged position; and the shift member is rotatably connected to a shift lever, which is fixed to a support shaft, the shift lever movable between a first shift lever position and a second shift lever position by axial rotation of a support shaft.

According to further aspects, the pawl grounding clutch with synchronizer assembly further includes an actuator motor and a reduction gear assembly connecting the actuator motor to the support shaft; wherein the actuator motor is selectively operated in opposite rotational directions, to axially rotate the support shaft in one of opposite first and second rotational directions, axial rotation of the support shaft thereby selectively rotating the shift lever between the first shift lever position and the second shift lever position.

According to further aspects, the synchronizer includes a friction surface directly contacting the hub when the pawl tooth is engaged with the gear.

According to further aspects, the pawl and the synchronizer are commonly mounted to a shaft, and each are axially rotated with respect to a longitudinal axis of the shaft.

According to further aspects, a biasing member is positioned in contact with the synchronizer and a portion of the pawl, the biasing member compressed when the synchronizer contacts the hub.

Further aspects, advantages and areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
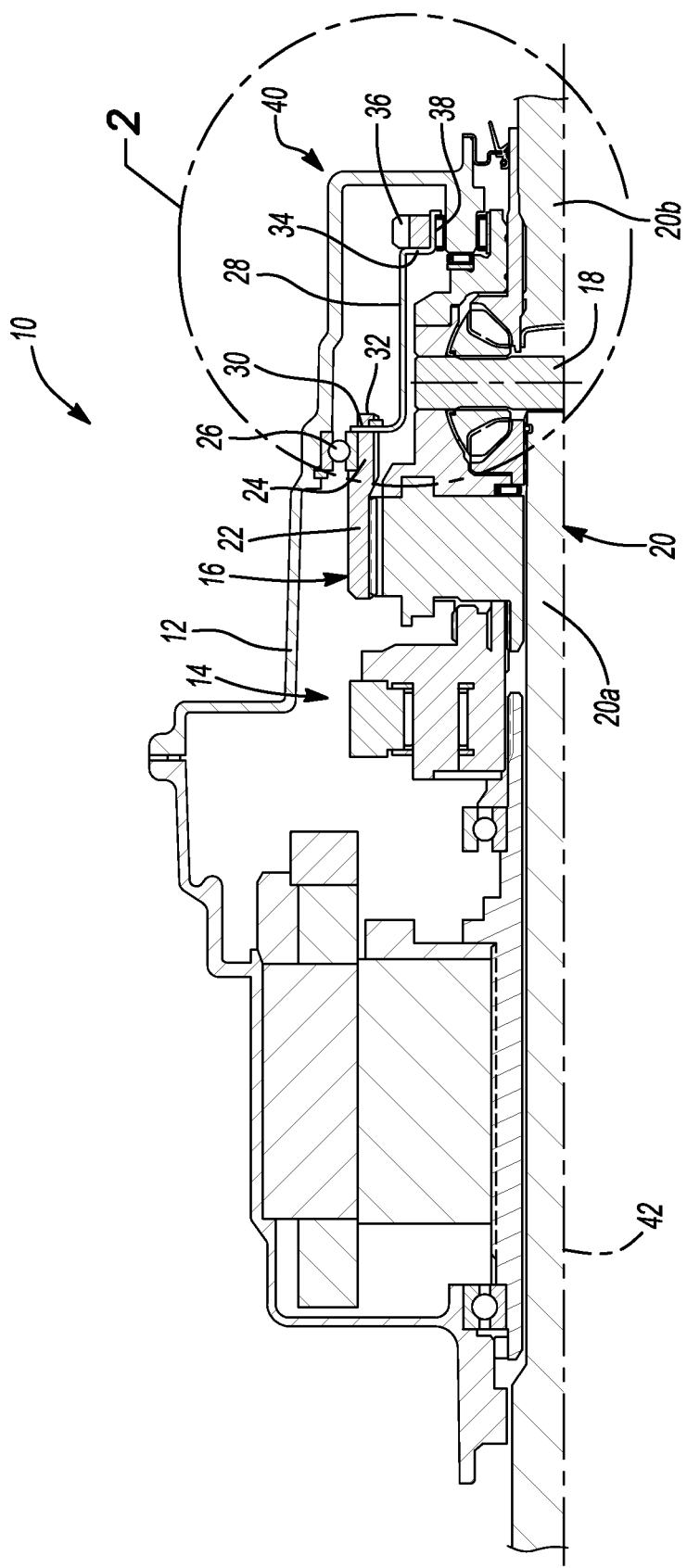
FIG. 1 is a cross sectional front elevational view of a transmission having a pawl grounding clutch with synchronizer according to the principles of the present disclosure.

With reference to FIG. 1, a drive unit or transmission is illustrated and generally designated by reference number 10. The transmission 10 is preferably an automatic transmission of a motor vehicle (not shown). The transmission 10 includes a transmission housing or case 12, which can be a casting using a metal such as aluminum. A torque of the vehicle engine may be transferred through a series of planetary gear sets 14 to provide multiple transmission speeds. A final drive unit 16 is meshed to the planetary gear sets 14 which is rotatably coupled to a differential 18. The differential 18 rotates an axle assembly 20 defined by a first axle half 20a and a second axle half 20b.

According to several aspects, the final drive unit 16 includes a planetary gear set having a ring gear 22, a sun gear, and a carrier having pinions. A ring gear extension member 24 is integrally connected to and axially extends from the ring gear 22. The ring gear 22 and the ring gear extension member 24 are rotatably supported to the case 12 using a ball bearing assembly 26. A hub 28 is connected to the ring gear extension member 24 using a plurality of fingers 30 defining a first end of the hub 28 which are received between crenellated members 32 created in the ring gear extension member 24, defining a castellated connection between the ring gear extension member 24 and the hub 28. A gear 36 is fixed to a second end 34 of the hub 28. The second end 34 of the hub 28 and the gear 36 are rotatably supported to the case 12 using a bearing assembly 38. The hub 28, the ring gear extension member 24, and the gear 36 together define portions of a pawl grounding clutch assembly 40 of the present disclosure, which will be described in greater detail in reference to FIG. 2. The components including the planetary gear sets 14, the final drive unit 16, the differential 18, the axle assembly 20, and the pawl grounding clutch assembly 40 are all co-axially rotatably disposed with respect to a longitudinal axis 42.

Referring to FIG. 2 and again to FIG. 1, the fingers 30 are connected to the crenellated members 32 using a coupling member 44 such as a snap ring. According to several aspects, the gear 36 is fixed to the second end 34 of the hub 28 using a weld joint 46. Other methods can be also used to fix the gear 36, such as by splining, or other mechanical connections. The bearing assembly 38 is supported on a cylindrical surface 48 of a reinforced end member 50 of the case 12. The reinforced end member 50 also rotatably supports components of the differential 18 using a bearing assembly 52.

Figure 2:
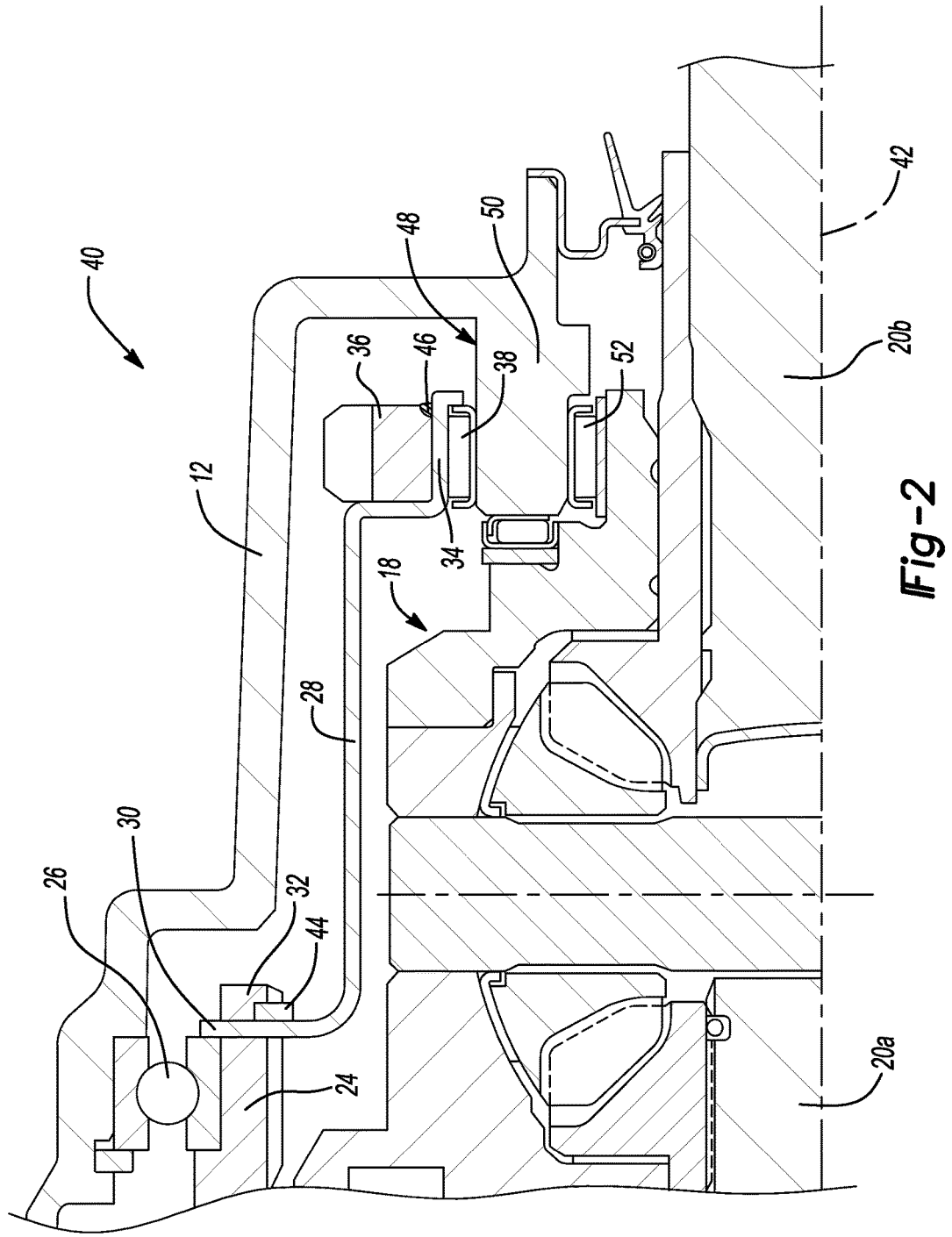
FIG. 2 is a cross sectional front elevational view taken at section 2 of FIG. 1.

Referring to FIG. 3 and again to FIGS. 1 through 2, the hub 28 defines a cylindrical body, having the fingers 30 oriented substantially perpendicular to a first cylindrical wall 54. Each of the fingers 30, such as exemplary finger 30a, is positioned between successive ones of the crenellated members 32 of the ring gear extension member 24, which define individual cavities 56. The coupling member 44 (not shown in FIG. 3 for clarity) which retains the fingers 30, is captured by a hooked end 58 of each of the crenellated members 32. The hub 28 can also include one or more apertures 60 which are provided to reduce a rotating mass of the hub 28. The apertures 60 can take any geometric form, such as the triangular shape shown. A second cylindrical wall 62 is positioned proximate to the second end 34 and acts as a friction contact surface which will be described in greater detail in reference to FIGS. 5-7. The gear 36 includes a plurality of crowned gear teeth 64 each separated by a tapered root 66.

Figure 3:
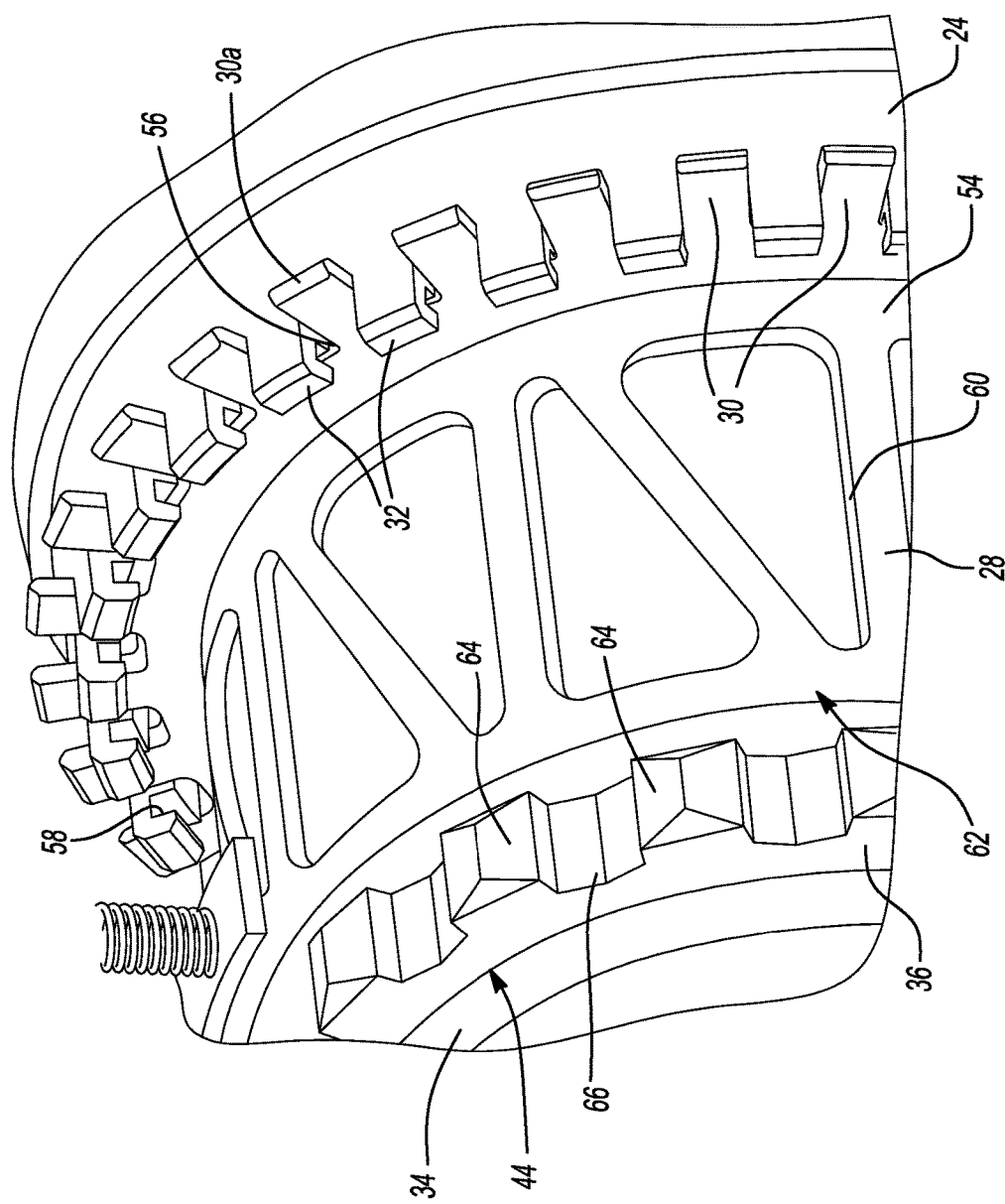
FIG. 3 is a rear left perspective view of a clutch hub and gear for the pawl grounding clutch of FIG. 1.

Referring to FIG. 4 and again to FIGS. 1 through 3, the pawl grounding clutch assembly 40 further includes a plurality of operating components defining a clutch subsystem 68. According to several aspects, the clutch subsystem 68 includes a pawl 70. The pawl 70 includes a single crowned pawl tooth 72 shaped to match the geometry of the tapered root 66 of the gear teeth 64 of gear 36, such that the pawl tooth 72 when meshed between any two successive gear teeth 64 provides an engaged drive position of the transmission 10, described in greater detail in reference to FIG. 7. The pawl 70 is rotatably supported on a shaft 74, which further rotatably supports a synchronizer 76. The shaft 74 is connected to structure (not shown) of the case 12. The synchronizer 76 rotates about the shaft 74 between a first synchronizer position 76a and a second synchronizer position 76b. The synchronizer 76 includes friction material defining a friction surface 78 (facing downward as viewed in FIG. 4). A biasing member 80 such as a coiled spring is positioned in contact with the synchronizer 76 and a portion of the pawl 70. The biasing member 80 compresses to permit the synchronizer 76 to move in a direction "A" from the first synchronizer position 76a to the spring compressed second synchronizer position 76b which is shown and described in reference to FIGS. 6 and 7.

The pawl 70 is also fixedly connected to a guide 82 which according to several aspects defines a rectangular shaped tube. A portion of a shift member 84 is positioned within and is slidingly received by the guide 82. The shift member 84 is shown in each of a first shift position 84a, defining a transmission neutral position, and a second shift position 84b, defining a transmission engaged position. The shift member 84 is rotatably connected to a shift lever 86, which is fixed to a support shaft 88. The shift lever 86 is movable between a first shift lever position 86a, and a second shift lever position 86b by axial rotation of the support shaft 88, which is itself rotatably supported by a shaft 90, which axially rotates with respect to a longitudinal axis 92. The support shaft 88 is positioned substantially within the case 12, and is rotatably and sealably connected to the case 12 by a seal member 94.

The shaft 90 is axially rotated by operation of an actuator motor 96, which according to several aspects can be, but is not limited to a DC brushless motor. A reduction gear assembly 98 is provided between the actuator motor 96 and the shaft 90. The reduction gear assembly 98 includes a first reduction gear 100 directly coupled to and co-axially rotating the shaft 90, and a second reduction gear 102 having a stepped portion meshed with the first reduction gear 100, and gear teeth meshed with a driving gear 104 directly coupled to and axially rotated by operation of the actuator motor 96. The actuator motor 96 can be selectively operated in opposite rotational directions, therefore operation of the actuator motor 96 acts to axially rotate the shaft 90 in one of opposite first and second rotational directions "B" or "C". Axial rotation of the shaft 90 therefore selectively rotates the shift lever 86 between the first shift lever position 86a and the second shift lever position 86b.

Referring to FIG. 5 and again to FIGS. 1 through 4, in a clutch assembly open position, the gear tooth 72 of the pawl 70 is positioned clear of and therefore disengaged from the gear teeth 64 of the gear 36. In the clutch assembly open position, the output of the transmission 10 is de-coupled from the differential 18. Torque cannot be transferred to the differential 18 at this position, thereby defining a transmission neutral position. Also in the clutch assembly open position, the friction surface 78 of the synchronizer 76 is freely spaced away from, and therefore not in frictional contact with the second cylindrical wall 62 of the hub 28. The biasing force of the biasing member 80 continuously biases the synchronizer 76 away from the second cylindrical wall 62 of the hub 28. A biasing member 106, such as a torsion spring is engaged with the pawl 70 and normally biases the pawl 70 away from the hub 28, and therefore biases the pawl tooth 72 away from engagement with the gear 36.

Figure 5:
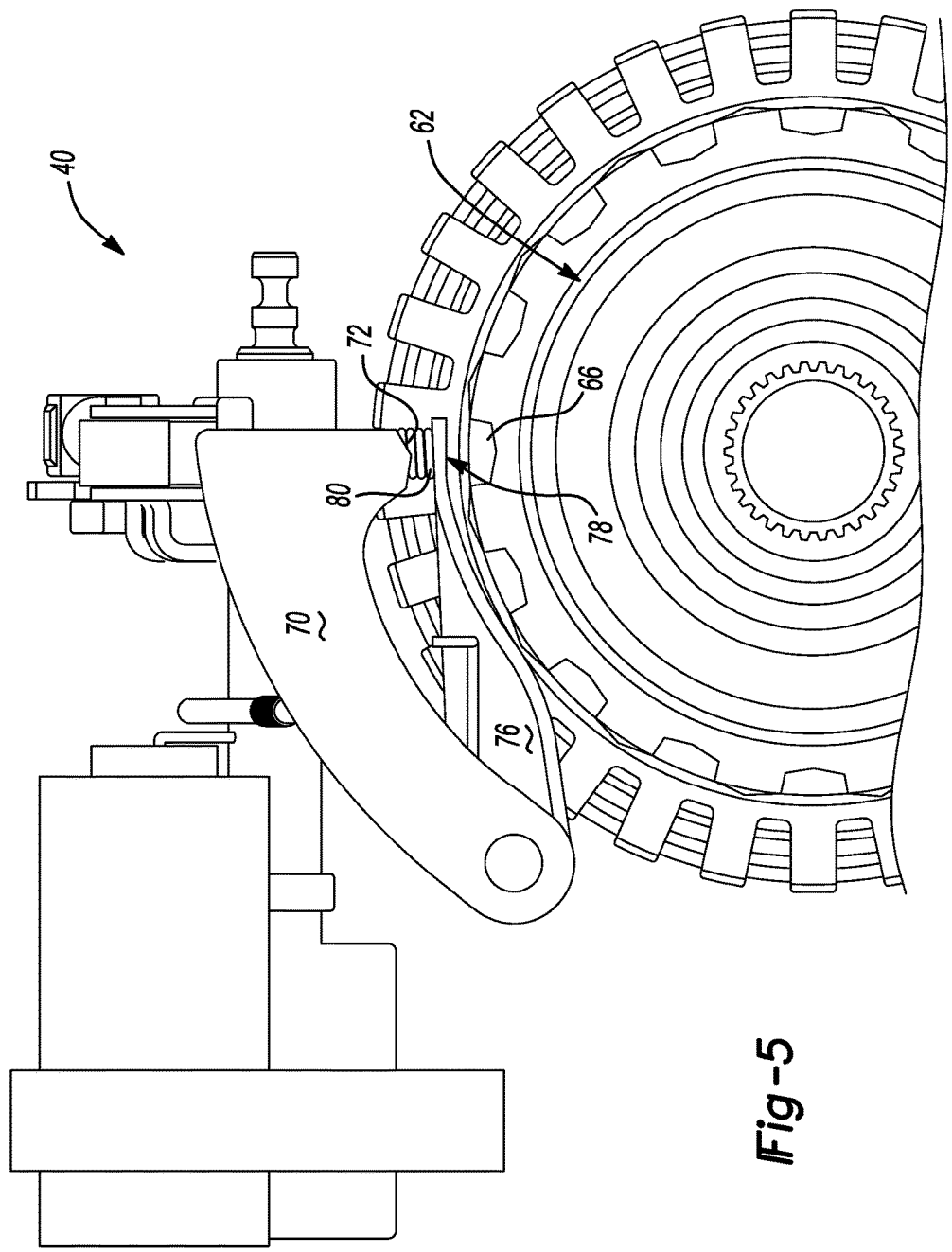
FIG. 5 is a rear elevational view of an open position of the pawl grounding clutch of FIG. 1.

Referring to FIG. 6 and again to FIG. 5, in the clutch assembly open position shown, a distance "D" between the friction surface 78 of the synchronizer 76 is less than a distance "E" between the pawl tooth 72 and a free end of the closest gear tooth 64'. The distance "D" is determined by preselecting a length of the biasing member 80, which retains the angular orientation of the synchronizer 76 on the shaft 74 with respect to the pawl 70. The biasing member 106 engaged directly with the pawl 70 normally biases the pawl 70 away from the gear 36 and toward the clutch assembly open position. Simultaneously, the biasing member 80 biases the synchronizer 76 away from the gear 36 and toward the clutch assembly open position, with both the synchronizer 76 and the pawl 70 rotatable about a longitudinal axis 108 of the shaft 74. The biasing member 80 acts against a surface 110 of the synchronizer 76.

Figure 6:
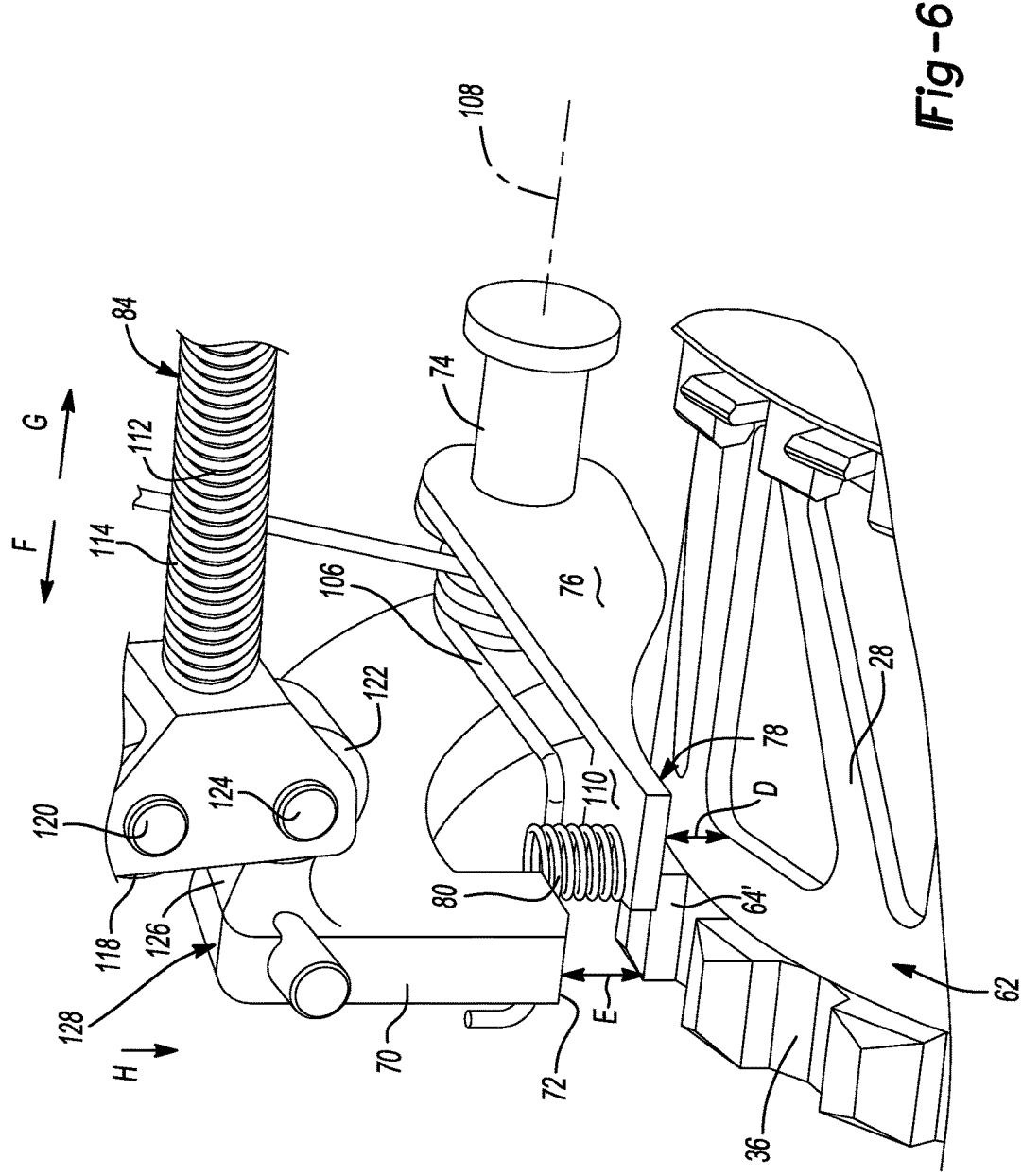
FIG. 6 is a rear left perspective view of the open position of the pawl grounding clutch of FIG. 1.
Figure 7:
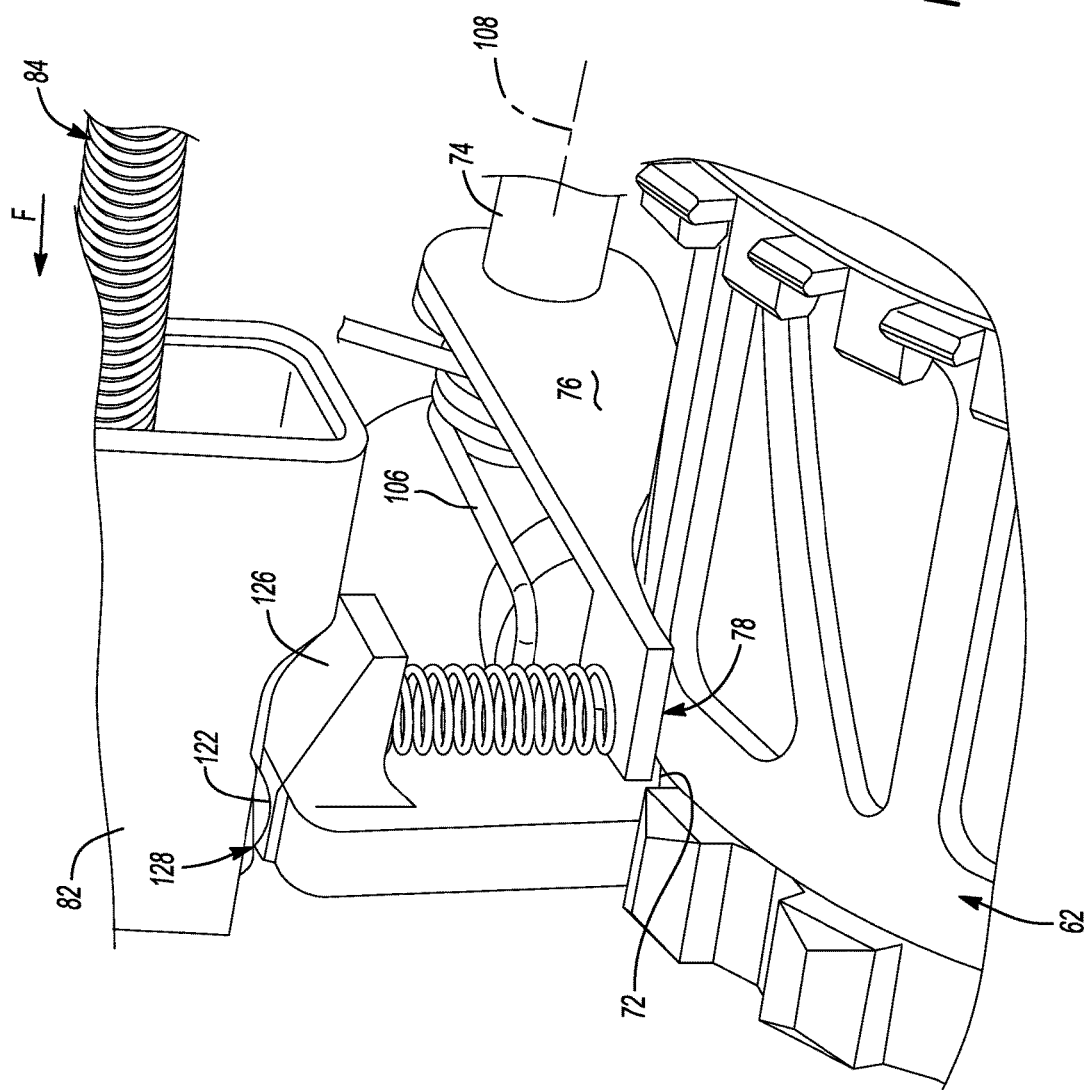
FIG. 7 is a rear left perspective view of a closed position of the pawl grounding clutch of FIG. 1.

To move the pawl 70 away from the clutch assembly open position such that the pawl tooth 72 will engage the gear 36, the shift member 84 includes a shift member tube 112 having a coiled tension spring 114 disposed about a length of the shift member tube 112. With reference again to FIG. 4, the actuator motor 96 is energized to displace the shift member to the second shift member position 84b, which as shown in FIG. 6 displaces the shift member 84 in a direction "F". The shift member 84 returns in an opposite direction "G". The shift member 84 includes a wheel housing 116 (normally positioned in the guide 82 (not shown in FIG. 6 for clarity). A first wheel 118 is rotatably disposed on a first wheel shaft 120 through the wheel housing 116. Similarly, a second wheel 122 is rotatably disposed on a second wheel shaft 124 through the wheel housing 116.

As the shift member 84 is displaced in the direction "F", the second wheel 122 contacts a tapered face 126 of the pawl 70, rotating the pawl 70 about the longitudinal axis 108. The pawl tooth 72 is rotated toward the gear 36 and the friction surface 78 of the synchronizer 76 is simultaneously rotated toward the second cylindrical wall 62 of the hub 28 each generally in a direction "H". Because the friction surface 78 is spaced at the distance "D" from the second cylindrical wall 62 which is less than the distance "E" between the pawl tooth 72 from the gear 36, the friction surface 78 will directly contact the second cylindrical wall 62 first, before the pawl tooth 72 contacts a tapered root 66 of the gear 36. The synchronizer friction surface 78 therefore assists engagement of the pawl tooth 72 by frictional contact with the second cylindrical wall 62 of the hub 28, to thereby slow rotation of the hub 28 to align the pawl tooth 72 with one of the tapered roots 66 of the gear 36. After the friction surface 78 contacts the second cylindrical wall 62 of the hub 28, the biasing member 80 compresses as the pawl 70 is further rotated until the pawl tooth 72 engages the gear 36. Compression of the biasing member 80 provides a positive engagement force to maintain frictional contact between the friction surface 78 and the second cylindrical wall 62 of the hub 28.

Referring to FIG. 7 and again to FIGS. 1 through 6, a clutch closed position is shown which results following frictional contact between the friction surface 78 of the synchronizer 76 and rotation of the pawl 70 about the axis of rotation 108 of the shaft 74, until the pawl tooth 72 engages with one of the tapered roots 66 between successive ones of the gear teeth 64. The pawl 70 is downwardly forced, as viewed in FIG. 7, by direct contact between the second wheel 122 of the shift member 84 and a planar surface 128 of the pawl 70. The second wheel 122 travels along the tapered surface 126 to reach the surface 128. The surface 128 is directly opposed to and oppositely facing with respect to the pawl tooth 72. In the clutch closed position the ring gear 22 of the final drive unit 16 is coupled via the hub 28 to the case 12. Torque is transferred to the differential 18 in the clutch closed position. The load applied to the clutch assembly 40 is from a torque on the ring gear 22 due to engine or motor drive torque. The design of the clutch assembly 40 of the present disclosure allows the pawl tooth 72 of the pawl 70 to be engaged or disengaged from the gear 36, even under full applied torque loading and at all ambient operating temperatures of the transmission 10.

Figure 8:
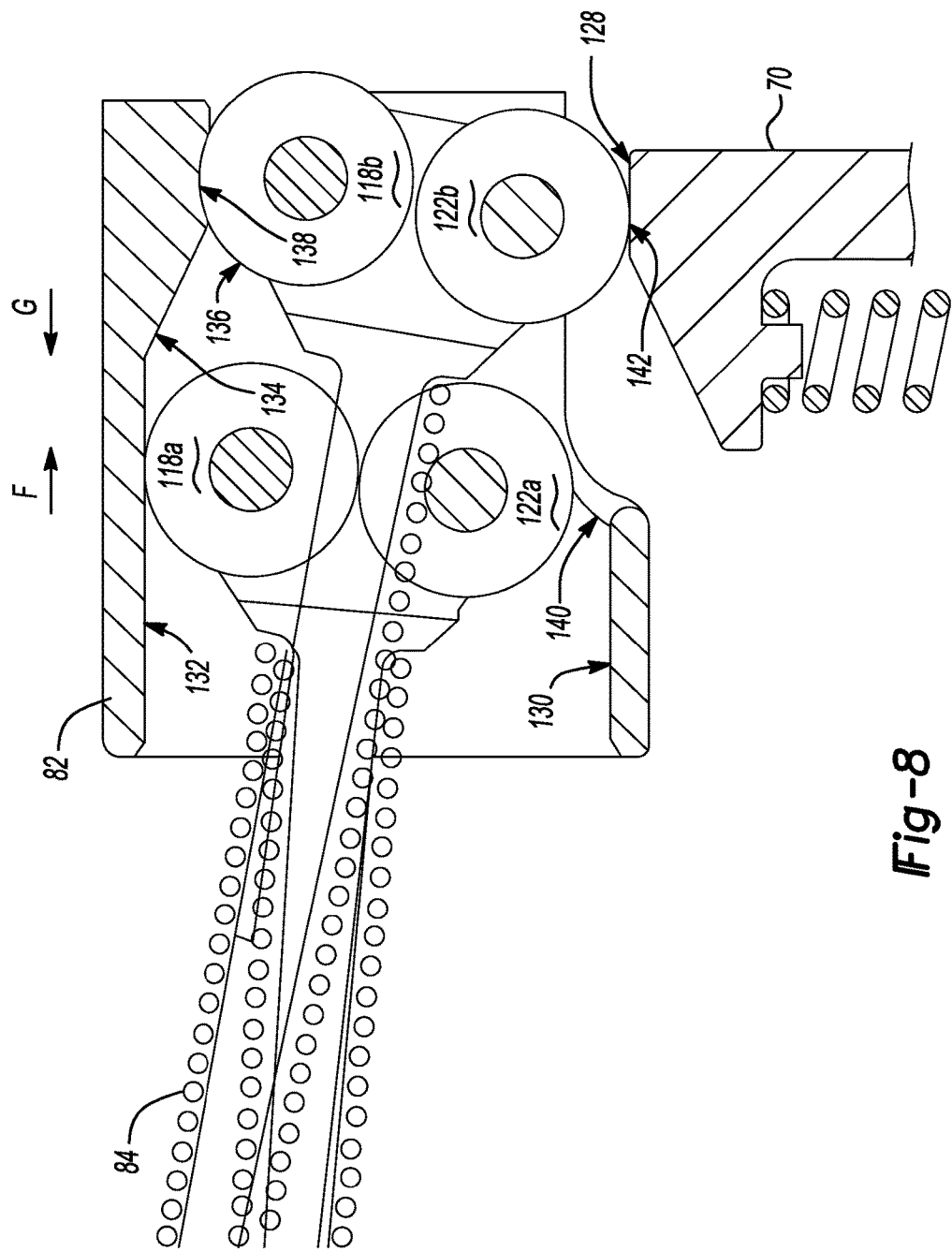
FIG. 8 is a cross sectional side elevational view taken at section 8 of FIG. 4.

Referring to FIG. 8 and again to FIGS. 1 through 7, the first wheel 118, and the second wheel 122 in the clutch open position are positioned generally between a lower wall 130 and a parallel upper wall 132 within a bore of the guide 82. As the shift member 84 is displaced in the direction "F", the first wheel 118 moves from a position 118a to a position 118b and the second wheel 122 moves from a position 122a to a position 122b. During this transition, the first wheel 118 contacts a downwardly tapered portion 134 of the upper wall 132 and moves into a position with a wheel outer surface 136 in direct contact with a surface 138, forcing both the first wheel 118 and the second wheel 122 downward. The second wheel 122 is thereby downwardly displaced through an opening 140 in the guide 82 while the outer surface 142 of the second wheel 122 contacts the surfaces 126 and 128 of the pawl 70. Retraction of the shift member 84 in the opposite direction "G" pulls the second wheel 122 out of the opening 140 until the first wheel 118 is positioned beneath the upper wall 132, thereby disengaging the second wheel 122 from contact with the surface 128 of the pawl 70.

Figure 4:
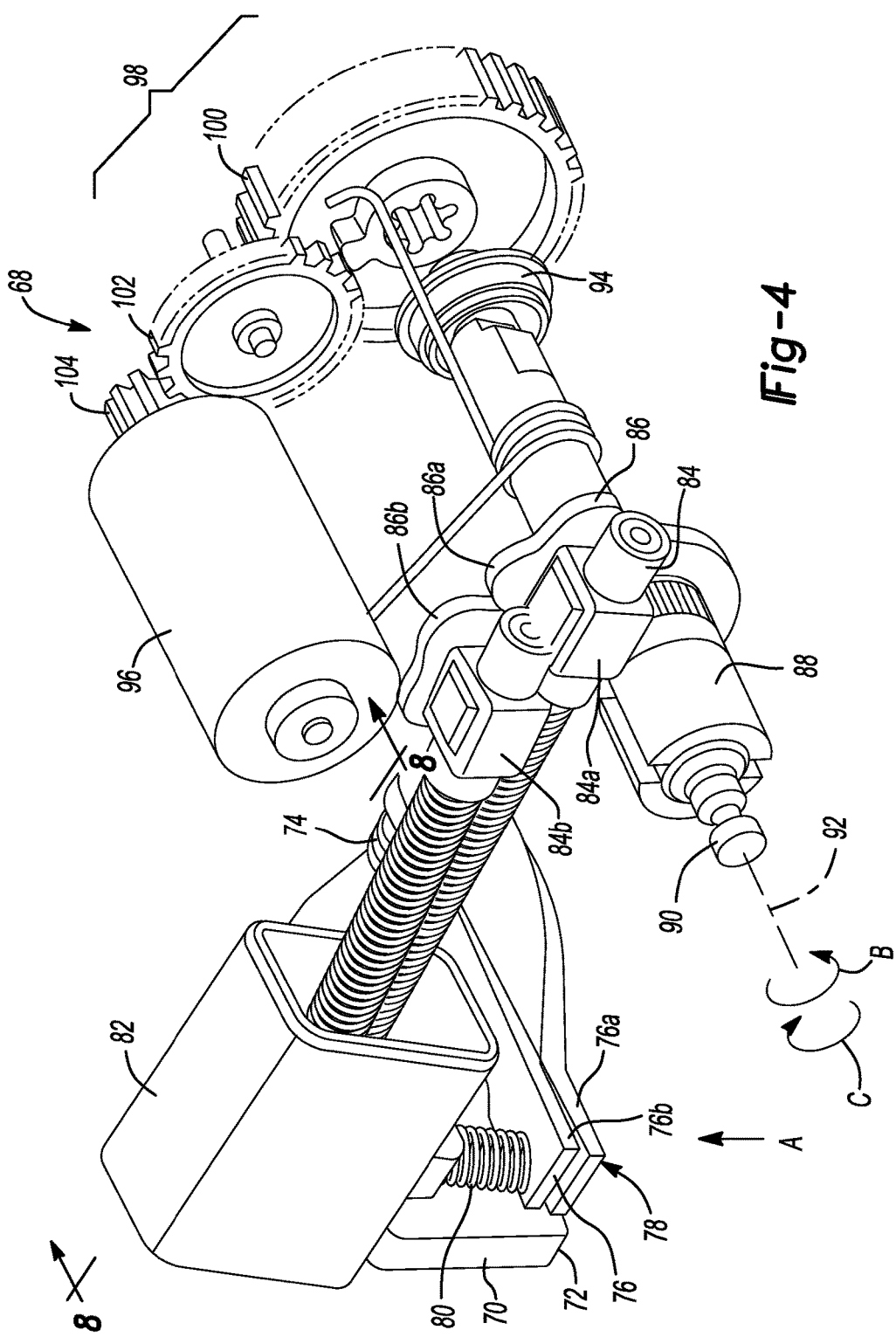
FIG. 4 is a front right perspective view of a clutch subsystem for the pawl grounding clutch of FIG. 1.
Figure 9:
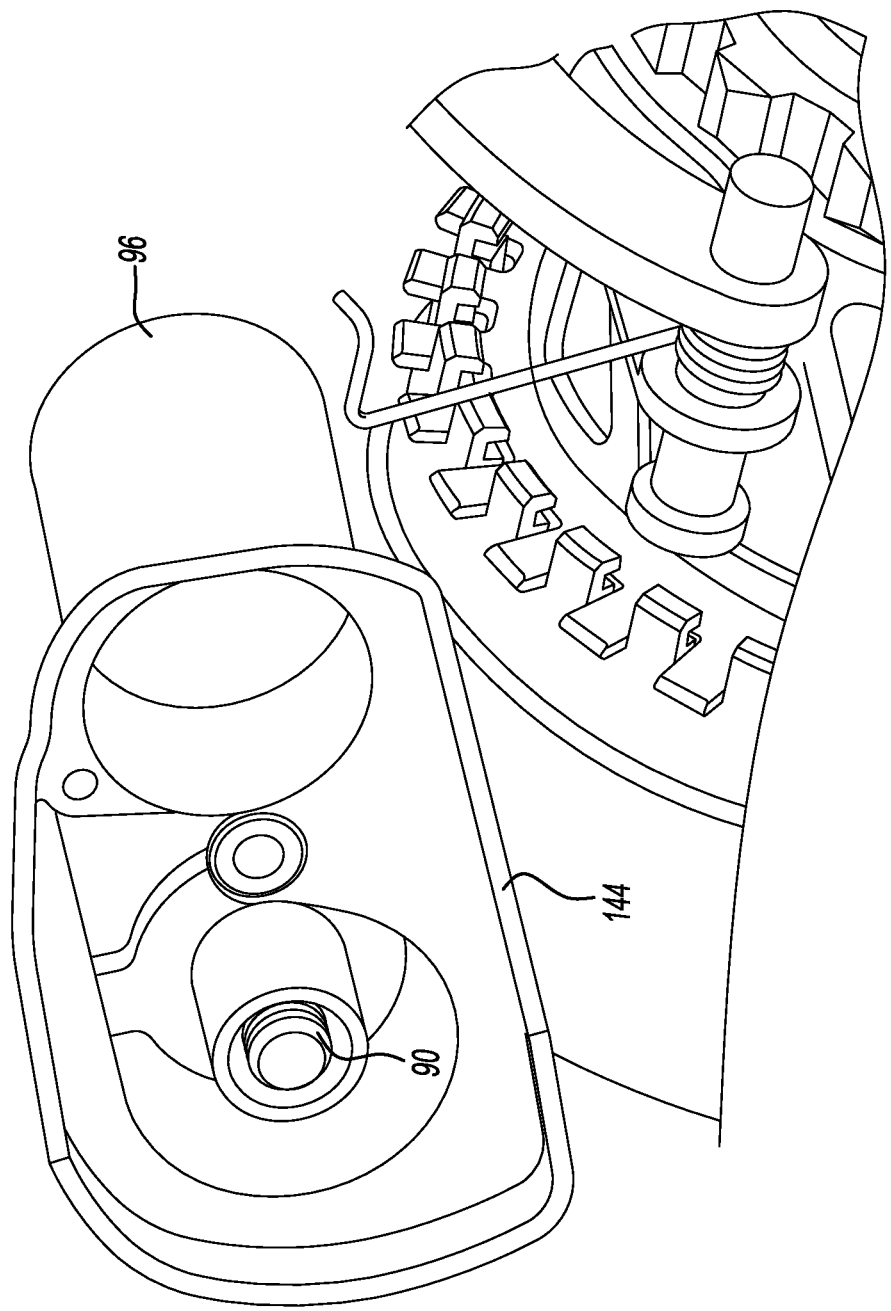
FIG. 9 is a front right perspective view of the pawl grounding clutch of FIG. 1.

Referring to FIG. 9 and again to FIG. 4, the reduction gear set 98 and the motor 96 are positioned outside of the case 12, therefore to protect the gears and rotatable connections of the reduction gear set 98, a housing 144 encloses components of the reduction gear set 98. The housing 144 and the actuator motor 96 are externally mounted to the case 12, with the shaft 90 extending through the seal member 94. A portion of the shaft 90 enters the housing 144 where it is connected to the first reduction gear 100.

Referring again to FIGS. 1-9, the clutch assembly 40 for a motor vehicle transmission 10 of the present disclosure includes a pawl grounding clutch with synchronizer assembly 40 for a motor vehicle transmission, including a ring gear 22 of a final drive assembly 16. A cylindrical hub 28 is engaged to the ring gear 22 such that the hub 28 is co-rotated with the ring gear 22. A gear 36 is fixed to the hub 28. A pawl 70 having a pawl tooth 72 is rotated about a shaft 74 between a first position with the pawl tooth 72 spaced away from gear teeth 64 of the gear 36 and a second position having the pawl tooth 72 engaged between two successive teeth 64 of the gear 36. A synchronizer 76 is mounted on the shaft 74 and is rotated during rotation of the pawl 70. The synchronizer 76 has a friction surface 78 directly contacting the hub 28 before the pawl tooth 72 engages the gear 36. A shift member 84 contacts the pawl 70 to displace the pawl 70 between the first position and the second position. The pawl 70 in the second position with the pawl tooth 72 engaged with the gear teeth 64 engages the pawl grounding clutch with synchronizer assembly 40 with a case 12, defining a clutch closed position. When the pawl 70 is in the first position with the pawl tooth 72 disengaged from the gear teeth 64, the pawl grounding clutch is disengaged from the final drive member 16, disengaging the hub 28 from the case 12, thereby defining a clutch open position.

The description of the invention is merely exemplary in nature and variations that do not depart from the gist of the invention are intended to be within the scope of the invention. Such variations are not to be regarded as a departure from the spirit and scope of the invention.

What is claimed is:

1. A pawl grounding clutch with synchronizer assembly for a motor vehicle, comprising:
   a gear fixed to a hub;
   a pawl having a pawl tooth, the pawl rotated between a first position with the pawl tooth spaced away from gear teeth of the gear and a second position having the pawl tooth engaged between two successive teeth of the gear;
   a synchronizer rotated during rotation of the pawl, the synchronizer directly contacting the hub before the pawl tooth engages the gear; and
   a shift member, the shift member when contacting the pawl displacing the pawl between the first position and the second position.

2. The pawl grounding clutch with synchronizer assembly for a motor vehicle of claim 1, further including a planetary gear set of a drive unit containing multiple members, the cylindrical hub engaged to one of the members of the planetary gear set such that the hub is co-rotated with the engaged planetary gear set member.

3. The pawl grounding clutch with synchronizer assembly for a motor vehicle of claim 2, wherein the pawl in the second position with the pawl tooth engaged with the gear teeth engages the planetary gear set member with a case defining a clutch closed position, and wherein the pawl in the first position with the pawl tooth disengaged from the gear teeth disengages the planetary gear set member from the case, thereby defining a clutch open position.

4. The pawl grounding clutch with synchronizer assembly for a motor vehicle of claim 3, wherein in the clutch open position, a distance between the friction surface of the synchronizer and the hub is less than a distance between the pawl tooth and a free end of a closest gear tooth of the gear.

5. The pawl grounding clutch with synchronizer assembly for a motor vehicle of claim 2, wherein the hub and the planetary gear set member are coaxially aligned on a common longitudinal axis.

6. The pawl grounding clutch with synchronizer assembly for a motor vehicle of claim 2, wherein the planetary gear set includes a ring gear having multiple crenellated members.

7. The pawl grounding clutch with synchronizer assembly for a motor vehicle of claim 6, wherein the hub defines a cylindrical body including multiple fingers extending from a first end of the body individually received between successive ones of the crenellated members of the ring gear to engage the hub to the ring gear.

8. The pawl grounding clutch with synchronizer assembly for a motor vehicle of claim 7, wherein the gear is fixed to a second end of the hub opposite to the fingers, the second end of the hub and the gear being rotatably supported to a case of a transmission using a bearing assembly.

9. The pawl grounding clutch with synchronizer assembly for a motor vehicle of claim 1, further including a guide fixed to a case, wherein a portion of the shift member is positioned within and is slidingly received by the guide.

10. The pawl grounding clutch with synchronizer assembly for a motor vehicle of claim 9:
    wherein the shift member is moved between each of a first shift position, defining a transmission neutral position, and a second shift position, defining a transmission engaged position; and
    wherein the shift member is rotatably connected to a shift lever, which is fixed to a support shaft, the shift lever movable between a first shift lever position and a second shift lever position by axial rotation of the support shaft.

11. The pawl grounding clutch with synchronizer assembly for a motor vehicle of claim 10, further including:
    an actuator motor; and
    a reduction gear assembly connecting the actuator motor to the support shaft;
    wherein the actuator motor is selectively operated in opposite rotational directions, to axially rotate the support shaft in one of opposite first and second rotational directions, axial rotation of the support shaft thereby selectively rotating the shift lever between the first shift lever position and the second shift lever position.

12. The pawl grounding clutch with synchronizer assembly for a motor vehicle of claim 1, wherein the synchronizer includes a friction surface directly contacting the hub when the pawl tooth is engaged with the gear.

13. The pawl grounding clutch with synchronizer assembly for a motor vehicle of claim 1, wherein the pawl and the synchronizer are commonly mounted to a shaft, and each are axially rotated with respect to a longitudinal axis of the shaft.

14. The pawl grounding clutch with synchronizer assembly for a motor vehicle of claim 1, further including a biasing member positioned in contact with the synchronizer and a portion of the pawl, the biasing member compressed when the synchronizer contacts the hub.

15. A pawl grounding clutch with synchronizer assembly for a motor vehicle transmission, comprising:
- a ring gear of a drive unit;
- a cylindrical hub engaged to the ring gear such that the hub is co-rotated with the ring gear;
- a gear fixed to the hub;
- a pawl having a pawl tooth, the pawl rotated about a shaft between a first position with the pawl tooth spaced away from gear teeth of the gear and a second position having the pawl tooth engaged between two successive teeth of the gear;
- a synchronizer mounted on the shaft and rotated during rotation of the pawl, the synchronizer having a friction surface directly contacting the hub before the pawl tooth engages the gear; and
- a shift member contacting the pawl to displace the pawl between the first position and the second position;
- wherein the pawl in the second position with the pawl tooth engaged with the gear teeth engages the ring gear with a case defining a clutch closed position, and wherein the pawl in the first position with the pawl tooth disengaged from the gear teeth disengages the ring gear from the case, thereby defining a clutch open position.

16. The pawl grounding clutch with synchronizer assembly for a motor vehicle of claim 15, wherein the ring gear includes multiple crenellated members.

17. The pawl grounding clutch with synchronizer assembly for a motor vehicle of claim 16, wherein the cylindrical hub includes multiple fingers individually received between successive ones of the crenellated members of the ring gear to engage the hub to the ring gear.

18. The pawl grounding clutch with synchronizer assembly for a motor vehicle of claim 15, further including an actuator motor coupled to a reduction gear set coupled to the shift member.

19. The pawl grounding clutch with synchronizer assembly for a motor vehicle of claim 18, wherein operation of the actuator motor in a first rotational direction rotates the pawl to the second position acting to engage the pawl tooth with the gear teeth, thereby engaging the ring gear with the case in the clutch closed position, and wherein operation of the actuator motor in a second rotational direction translates the pawl to the first position acting to disengage the pawl tooth from the gear teeth, disengaging the ring gear from the case in the clutch open position.

20. A pawl grounding clutch with synchronizer assembly for a motor vehicle transmission, comprising:
- a ring gear of a drive unit having multiple crenellated members;
- a cylindrical hub having multiple fingers individually received between successive ones of the crenellated members of the ring gear to engage the hub to the ring gear such that the hub is co-rotated with the ring gear;
- a gear fixed to the hub;
- a pawl having a pawl tooth, the pawl rotated about a shaft between a first position with the pawl tooth spaced away from gear teeth of the gear and a second position having the pawl tooth engaged between two successive teeth of the gear;
- a synchronizer mounted on the shaft and rotated during rotation of the pawl, the synchronizer having a friction surface directly contacting the hub before the pawl tooth engages the gear; and
- an actuator motor coupled to a reduction gear set coupled to a shift member, the shift member contacting the pawl to displace the pawl between the first position and the second position;
- wherein operation of the actuator motor in a first rotational direction rotates the pawl to the second position acting to engage the pawl tooth with the gear teeth, thereby engaging the ring gear with a case defining a clutch closed position, and wherein operation of the actuator motor in a second rotational direction translates the pawl to the first position acting to disengage the pawl tooth from the gear teeth, disengaging the ring gear from the case, thereby defining a clutch open position.

* * * * *